(12) United States Patent
Minamikawa et al.

(10) Patent No.: US 8,928,955 B2
(45) Date of Patent: Jan. 6, 2015

(54) LINEAR LIGHT SOURCE APPARATUS AND IMAGE READING APPARATUS

(75) Inventors: Yoshinori Minamikawa, Kyoto (JP); Tomoharu Horio, Kyoto (JP); Okimoto Kondo, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 624 days.

(21) Appl. No.: 13/150,660

(22) Filed: Jun. 1, 2011

(65) Prior Publication Data

US 2011/0299138 A1 Dec. 8, 2011

(30) Foreign Application Priority Data

Jun. 2, 2010 (JP) ................................. 2010-126470
Jan. 12, 2011 (JP) ................................. 2011-003558

(51) Int. Cl.
*H04N 1/04* (2006.01)
*H04N 1/46* (2006.01)
*H04N 1/028* (2006.01)

(52) U.S. Cl.
CPC ....... *H04N 1/02815* (2013.01); *H04N 1/02825* (2013.01); *H04N 1/02835* (2013.01)
USPC ........... 358/475; 358/484; 358/483; 358/482; 358/509

(58) Field of Classification Search
USPC ......... 358/484, 475, 483, 482, 474, 509, 505; 250/208.1, 234–236; 355/67–70
See application file for complete search history.

(56) References Cited

U.S. PATENT DOCUMENTS

| | | | | |
|---|---|---|---|---|
| 5,182,445 A | * | 1/1993 | Yamashita .................. | 250/208.1 |
| 5,499,112 A | * | 3/1996 | Kawai et al. .................. | 358/475 |
| 5,650,585 A | * | 7/1997 | Pate et al. ............................ | 89/7 |
| 6,127,675 A | * | 10/2000 | Nakamura et al. ........ | 250/227.31 |
| 6,166,382 A | * | 12/2000 | Baker et al. ............... | 250/339.12 |
| 6,259,082 B1 | * | 7/2001 | Fujimoto et al. ........... | 250/208.1 |
| 6,259,854 B1 | * | 7/2001 | Shinji et al. .................... | 385/146 |
| 6,455,834 B2 | * | 9/2002 | Fujimoto et al. ........... | 250/208.1 |
| 6,469,808 B1 | * | 10/2002 | Onishi et al. .................. | 358/475 |
| 6,827,458 B2 | * | 12/2004 | Suga .............................. | 362/609 |
| 7,167,284 B2 | * | 1/2007 | Sawada ......................... | 358/483 |
| 7,385,594 B2 | * | 6/2008 | Liao et al. ..................... | 345/173 |
| 7,488,103 B2 | * | 2/2009 | Watanabe et al. ............. | 362/607 |
| 7,538,911 B2 | * | 5/2009 | Sakurai et al. ................ | 358/475 |
| 7,548,352 B2 | * | 6/2009 | Sakurai et al. ................ | 358/475 |
| 7,990,584 B2 | * | 8/2011 | Ikeda ............................ | 358/484 |
| 8,167,475 B2 | * | 5/2012 | Katsumata et al. ........... | 362/610 |

FOREIGN PATENT DOCUMENTS

JP 2007-27137 2/2007

* cited by examiner

*Primary Examiner* — Cheukfan Lee
(74) *Attorney, Agent, or Firm* — Hamre, Schumann, Mueller & Larson, P.C.

(57) ABSTRACT

A linear light source device illuminates a document properly, and an image reading device includes such a light source device. The light source device includes a light source and a light-guiding member. The light-guiding member introduces the light emitted from the light source from one end portion in x-direction, cause the light to travel in x-direction, and emits the light from a light exit portion at one end in z-direction, which is orthogonal to x-direction. The light-guiding member includes, at the other end in z-direction, a light-reflecting portion that reflects light to the light exit portion. One end face of the light-guiding member in y-direction, which is orthogonal to x- and z-directions, is inclined so as to become closer to the other end face in y-direction with decreasing distance from the light exit portion in z-direction. This allows light to easily travel to the light-reflecting portion.

11 Claims, 16 Drawing Sheets

LINEAR LIGHT SOURCE APPARATUS AND IMAGE READING APPARATUS

BACKGROUND OF THE INVENTION

1. Field of the Invention

The present invention relates to a linear light source apparatus and an image reading device including the linear light source apparatus.

2. Description of Related Art

An image reading device for reading documents is incorporated in, for example, a facsimile machine, a copier, and a scanner device. FIG. 20 shows an example of such an image reading device (for example, see JP 2007-27137A). The image reading device X shown in FIG. 20 includes a linear light source device 90, a lens array 94, a light-receiving element 95, a substrate 96, a case 97, and a glass cover 98 for loading a document G. The image reading device X reads the document G by illuminating the document G with the linear light source device 90 and guiding the light reflected from the document G through the lens array 94 to the light-receiving element 95.

FIG. 21 is a perspective view of the linear light source device 90. As shown in FIG. 21, the linear light source device 90 includes a white cover 91 elongated in the x-direction, an LED unit 92 assembled at one end of the white cover 91 in the x-direction, and a light-guiding member 93 that is formed in the shape of an elongated rod elongated in the x-direction and is housed in the white cover 91. The light-guiding member 93 includes a light exit portion 931 exposed from the white cover 91, a light-reflecting portion 932 for reflecting light to the light exit portion 931, and a pair of end faces 933 and 934 standing perpendicularly to the light-reflecting portion 932 (see FIG. 20). The pair of end faces 933 and 934 constitute surfaces that are parallel to each other and spaced away from each other in the y-direction. The light emitted from the LED unit 92 in the x-direction enters the light-guiding member 93 and travels inside the light-guiding member 93 in the x-direction, while being reflected. Any component of the light traveling inside the light-guiding member 93 that is reflected in the z-direction by the light-reflecting portion 932 is emitted in the z-direction from the light exit portion 931.

In the image reading device X, a document may be placed on the glass cover 98, with part of the document being suspended in the air. To appropriately illuminate such a suspended part of the document, the irradiation area of the linear light source device 90 needs to be extended in the y'-direction. On the other hand, extending the irradiation area of the linear light source device 90 in the y'-direction poses a problem in that the illuminance per unit area decreases, and it is desired to efficiently emit the light from the LED unit 92 in an emitting direction L.

However, the pair of end faces 933 and 934 of the light-guiding member 93 are parallel to each other, and therefore the light that is incident normally on one of the end faces 933 and 934 is reflected so as to be directly incident normally on the other of the end faces 933 and 934. Such light keeps being reflected inside the light-guiding member 93 without proceeding to either of the light exit portion 931 or the light-reflecting portion 932, and thus will not be emitted from the light exit portion 931 to the outside of the light-guiding member 93. In order to increase the quantity of light from the linear light source device 90, there is demand for an innovation for achieving a further reduction of such light that is not emitted to the outside.

Further, the image reading device X has another problem in that part of the light emitted from the linear light source device 90 is blocked by the lens array 94, resulting in a reduction in the quantity of light reaching the document G.

SUMMARY OF THE INVENTION

The present invention has been proposed in view of the foregoing circumstances, and it is an object of the present invention to provide a linear light source device capable of supplying an increased quantity of light to a document in an appropriate manner and an image reading device including such a linear light source device.

According to a first aspect of the present invention, there is provided a linear light source device including: a light source; and a light-guiding member that introduces light emitted from the light source from one end portion in a first direction, causes the light to travel in the first direction, and emits the light from a light exit portion provided at one end in a second direction orthogonal to the first direction, the light-guiding member including, at another end in the second direction, a light-reflecting portion that reflects light to the light exit portion, wherein one end face of the light-guiding member in a third direction orthogonal to the first direction and the second direction is inclined so as to become closer to another end face in the third direction with decreasing distance from the light exit portion in the second direction.

In a preferred embodiment, the other end face of the light-guiding member in the third direction is inclined so as to become closer to the one end face in the third direction with decreasing distance from the light exit portion in the second direction.

With this configuration, light that has been reflected by the end face in the third direction can easily reach the light-reflecting portion, and therefore the quantity of light that is reflected by the light-reflecting portion in the second direction can easily increase. Accordingly, the linear light source device of the present invention can facilitate an increase in light quantity.

In a preferred embodiment, the light-reflecting portion includes a plurality of recesses arranged in the first direction, and each of the recesses includes a first inclined surface that is inclined so as to become closer to the light exit portion in the second direction with increasing distance from the light source in the first direction and a second inclined surface that is inclined so as to become more distant from the light exit portion in the second direction with increasing distance from the light source in the first direction.

In a preferred embodiment, in each of the recesses, a length in the first direction of the second inclined surface is greater than a length in the first direction of the first inclined surface.

In a preferred embodiment, the plurality of recesses are formed such that a width thereof in the third direction increases the farther a position thereof from the light source in the first direction.

In a preferred embodiment, each of the recesses includes a bottom face being perpendicular to the second direction and being disposed between the first inclined surface and the second inclined surface in the first direction.

In a more preferred embodiment, the plurality of recesses are formed such that a length in the first direction of the first inclined surface increases the farther a position thereof from the light source in the first direction.

In a preferred embodiment, light-reflecting portion includes, at a position that is closer to the light source than the plurality of recesses in the first direction, a scattering surface that scatters light from the light source.

In a preferred embodiment, the light-guiding member includes a band-shaped scattering surface that extends in the first direction and that scatters light from the light source.

More preferably, the band-shaped scattering surface is provided over the entire length of the light-guiding member in the first direction.

More specifically, the light-guiding member includes a pair of inclined surfaces that are increasingly spaced away from each other in the third direction with increasing distance from the light-reflecting portion in the second direction, and at least one of the pair of inclined surfaces constitutes the band-shaped scattering surface.

In a preferred embodiment, the light exit portion includes a first exit surface provided toward one side in the third direction and a second exit surface provided toward another side in the third direction, and a first angle between a line in the second direction and a line connecting one end portion to another end portion of the first exit surface in the third direction is different from a second angle between a line in the second direction and a line connecting one end portion to another end portion of the second exit surface in the third direction.

In a more preferred embodiment, the first exit surface and the second exit surface each constitute a part of a continuous circular arc in a cross section perpendicular to the first direction.

In another preferred embodiment, the one end face of the light-guiding member in the third direction extends further toward one side in the second direction than the other end face does, and the light exit portion constitutes a flat surface connecting an end edge of the one end face on one side in the second direction to an end edge of the other end face on one side in the second direction.

According to a second aspect of the present invention, there is provided an image reading device including: a linear light source device that is provided according to the first aspect of the present invention and that applies light to a document; a lens array that collects reflected light that is light from the linear light source device that has been reflected from the document; and a light-receiving element that receives the light collected from the lens array.

In a more specific embodiment, an image reading device includes: a linear light source that includes a first exit surface provided toward one side in the third direction and a second exit surface provided toward another side in the third direction and that applies light to a document; a lens array that collects reflected light that is light from the linear light source device that has been reflected from the document; and a light-receiving element that receives the light collected from the lens array, wherein the linear light source device is disposed such that the second exit surface is in closer proximity with the lens array than the first exit surface is, and the first angle is greater than the second angle.

According to a third aspect of the present invention, there is provided an image reading device including: a linear light source device that is provided according to another preferred embodiment of the first aspect of the present invention and that applies light to a document; a lens array that collects reflected light that is light from the linear light source device that has been reflected from the document; and a light-receiving element that receives the light collected from the lens array, wherein the linear light source device is disposed such that an end edge of the other end face on one side in the second direction is in closer proximity with the lens array than an end edge of the one end face on one side in the second direction is.

Other features and advantages of the present invention will become more apparent from the detailed description given below with reference to the accompanying drawings.

DETAILED DESCRIPTION OF THE PREFERRED EMBODIMENTS

Preferred embodiments of the present invention will now be specifically described below with reference to the accompanying drawings.

Figure 1:
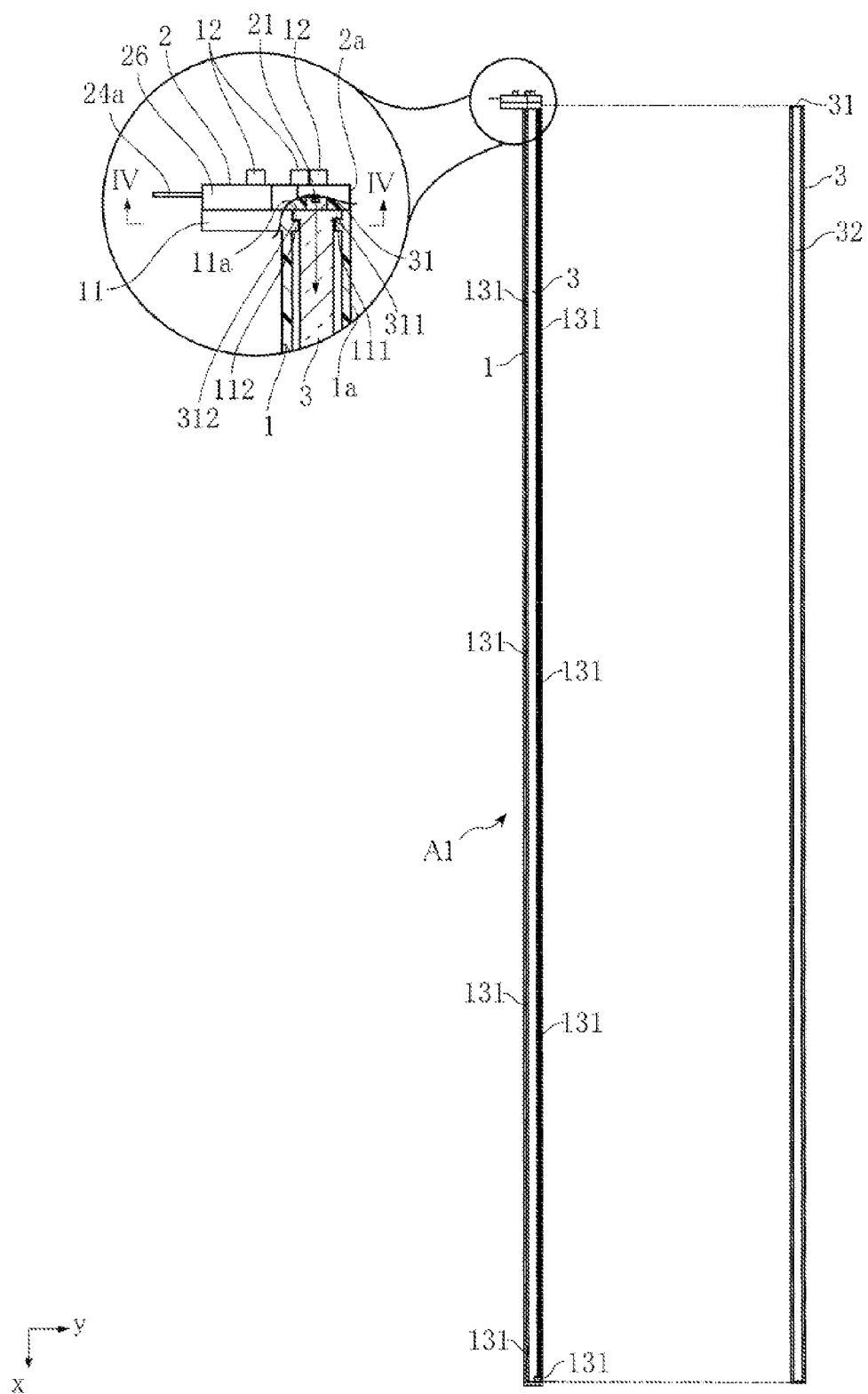
FIG. 1 is a plan view of a linear light source device according to a first embodiment of the present invention.
Figure 2:
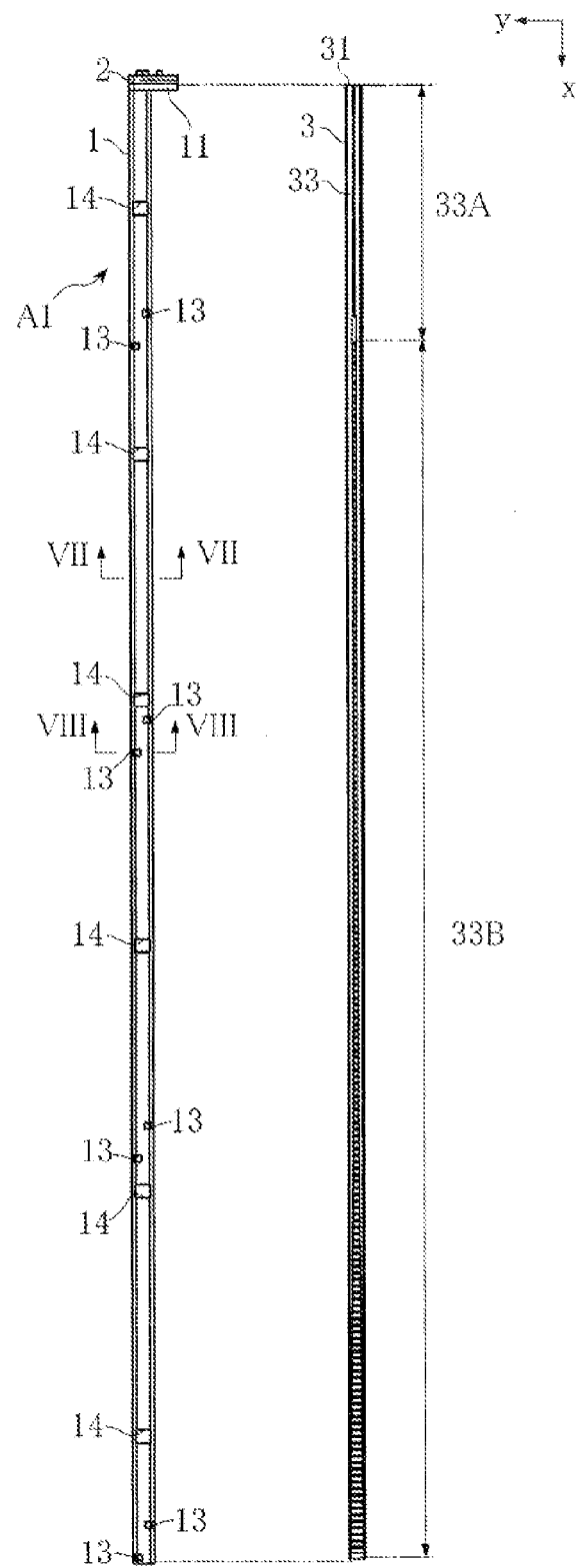
FIG. 2 is a bottom view of the linear light source device shown in FIG. 1.
Figure 10:
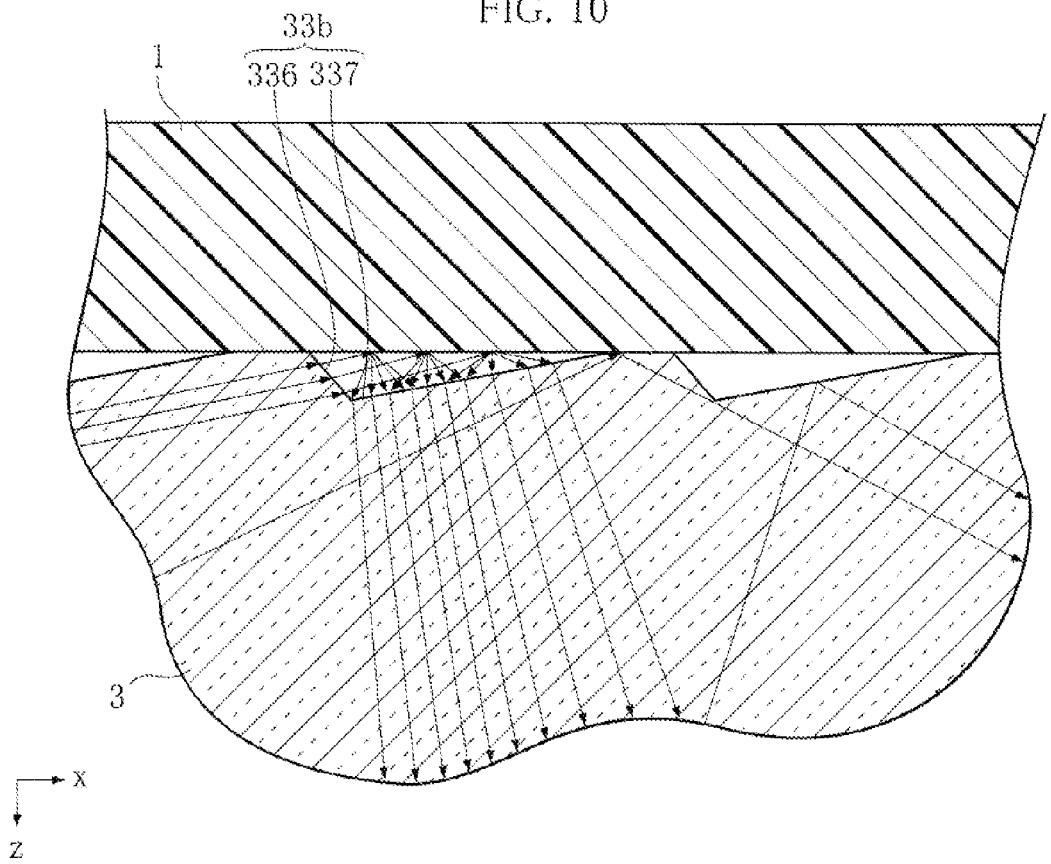
FIG. 10 shows how light is reflected inside the light-guiding member shown in FIG. 9.
Figure 11:
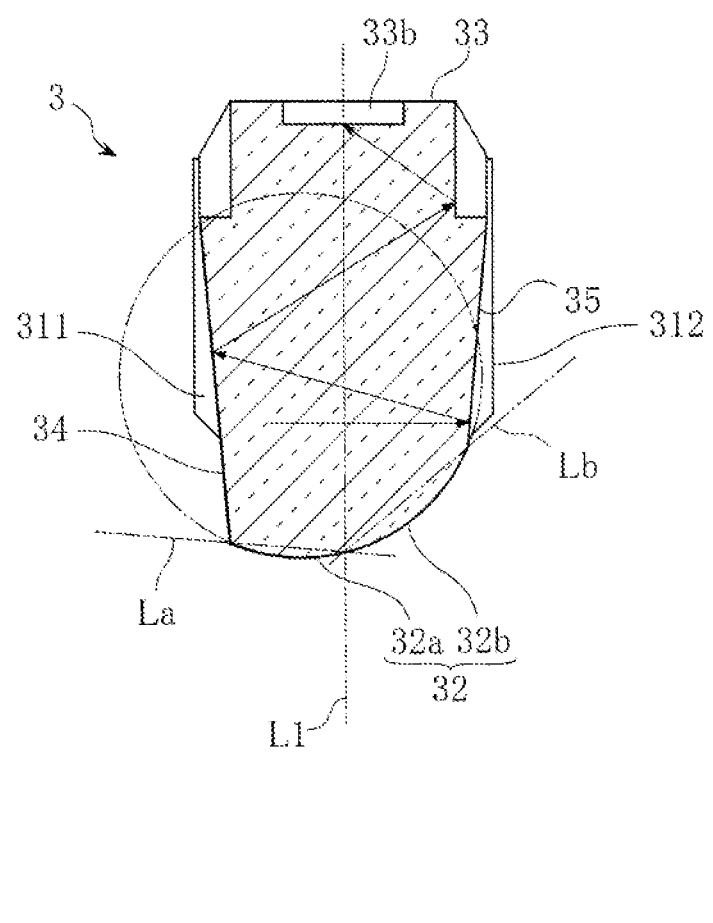
FIG. 11 is a cross-sectional view taken along the arrow XI-XI in FIG. 9.
Figure 12:
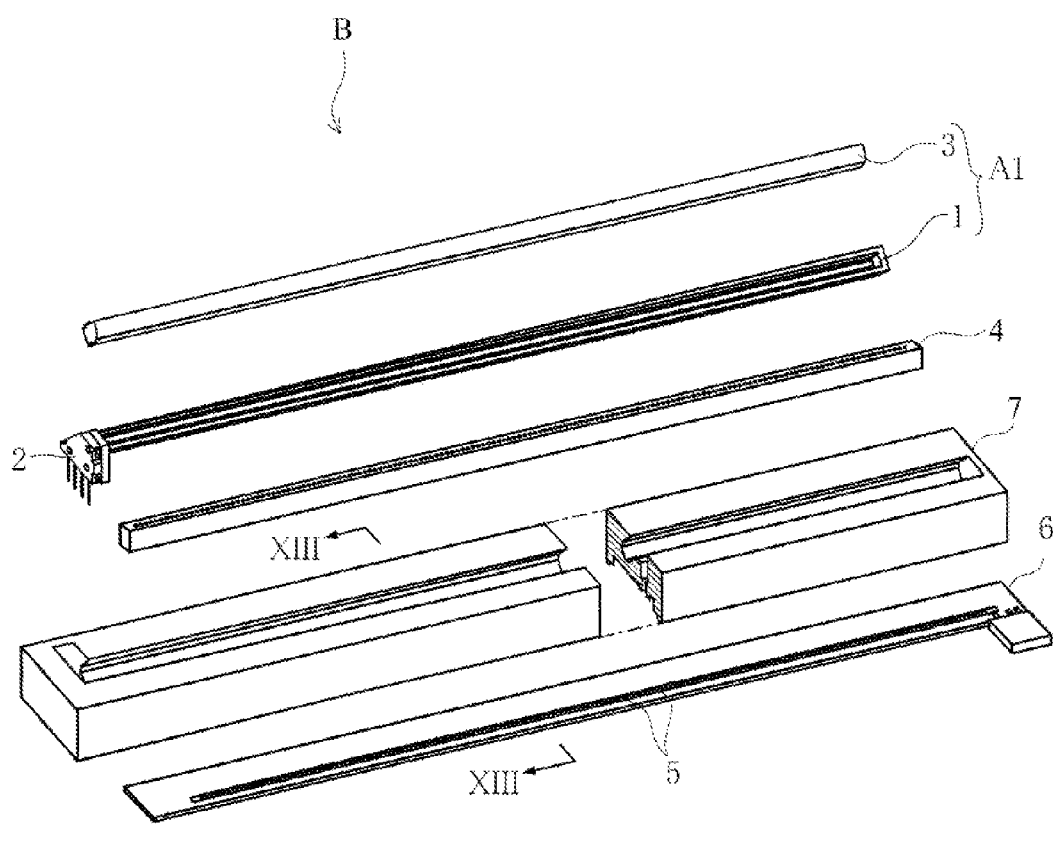
FIG. 12 is an exploded perspective view of an image reading device incorporating the linear light source device shown in FIG. 1.
Figure 13:
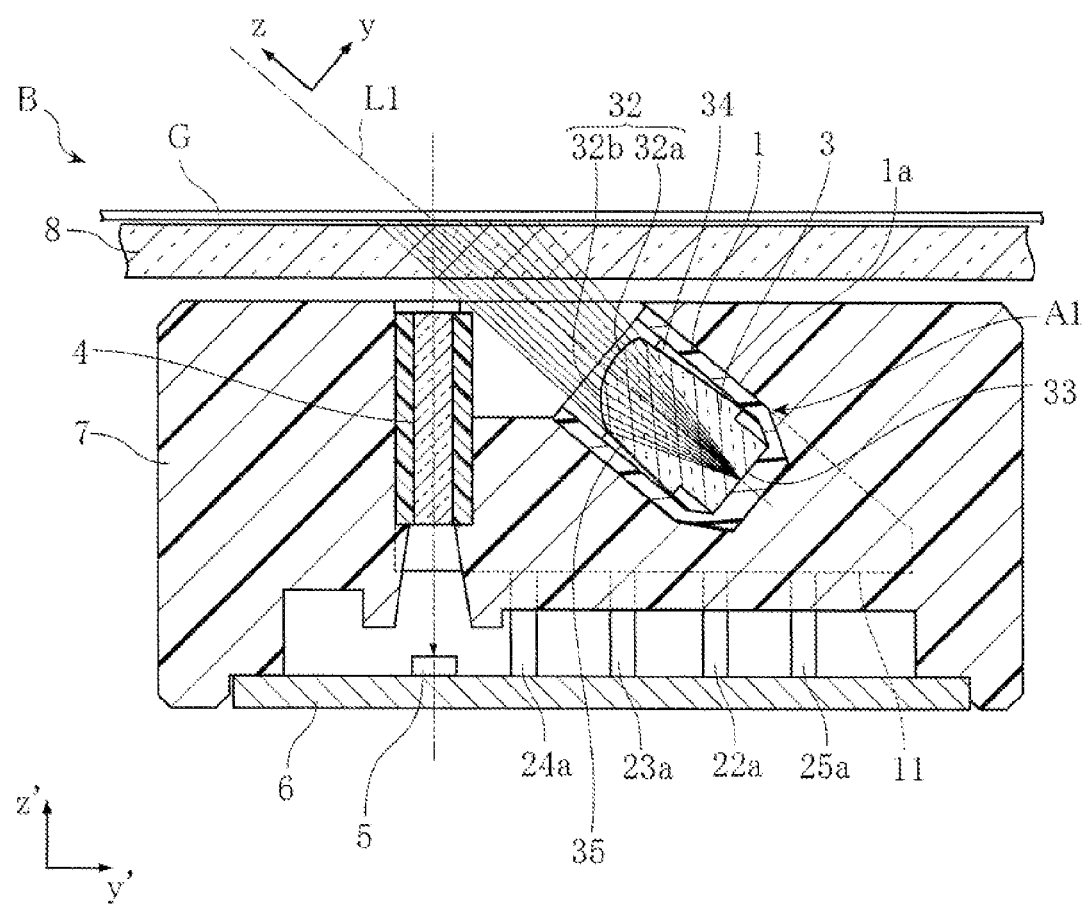
FIG. 13 is a cross-sectional view taken along the arrow XIII-XIII in FIG. 12.

FIGS. 1 to 11 show a linear light source device according to a first embodiment of the present invention. As shown in FIGS. 1 and 2, a linear light source device A1 includes a white case 1 formed in the shape of an elongated rod elongated in the x-direction, an LED unit 2 attached at one end of the white case 1 in the x-direction, and a light-guiding member 3 that can be housed in the white case 1. FIG. 1 also shows the light-guiding member 3 housed in the white case 1. FIGS. 12 and 13 show an image reading device B incorporating the linear light source device A1. The image reading device B includes a lens array 4, a light-receiving element 5, a substrate 6 for supporting the light-receiving element 5, a case 7 for housing these components, and a glass cover 8 on which a document G is placed. The glass cover 8 is attached to the casing portion of a scanner device or the like in which the image reading device B is to be incorporated, and is omitted in FIG. 12. The y'- and z'-directions shown in FIG. 13 are orthogonal to the x-direction and are inclined to the y- and z-directions shown in FIG. 4.

Figure 4:
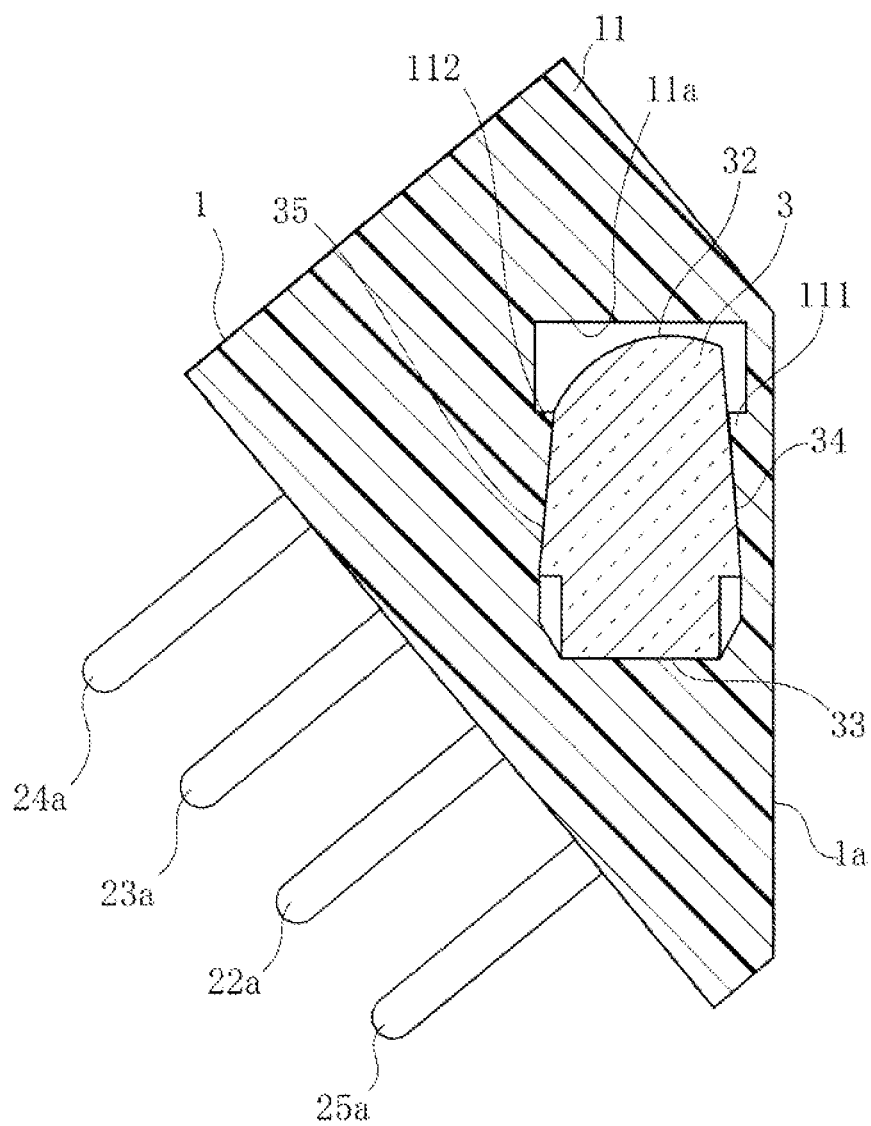
FIG. 4 is a cross-sectional view taken along the arrow IV-IV in FIG. 1.
Figure 7:
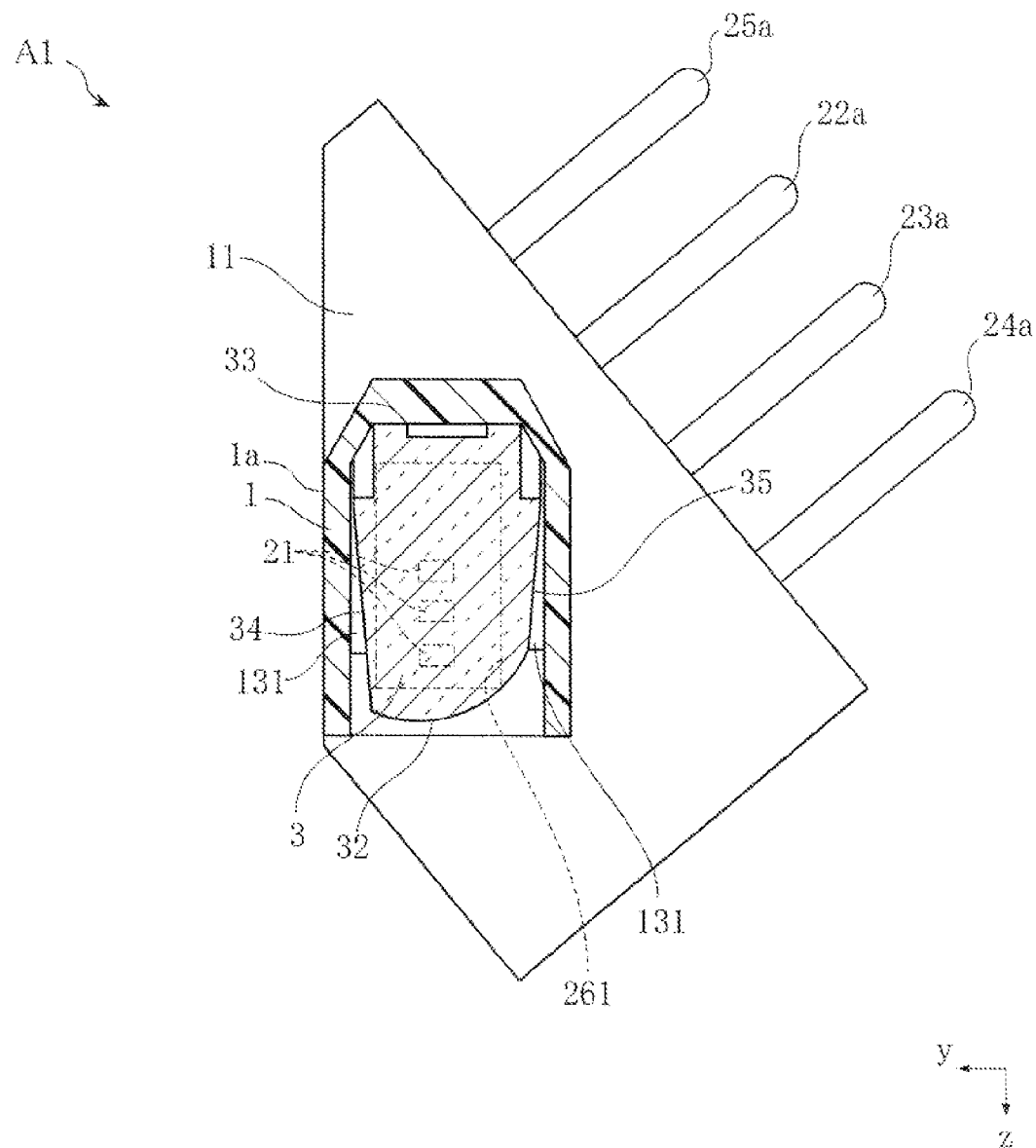
FIG. 7 is a cross-sectional view taken along the arrow VII-VII in FIG. 2.
Figure 8:
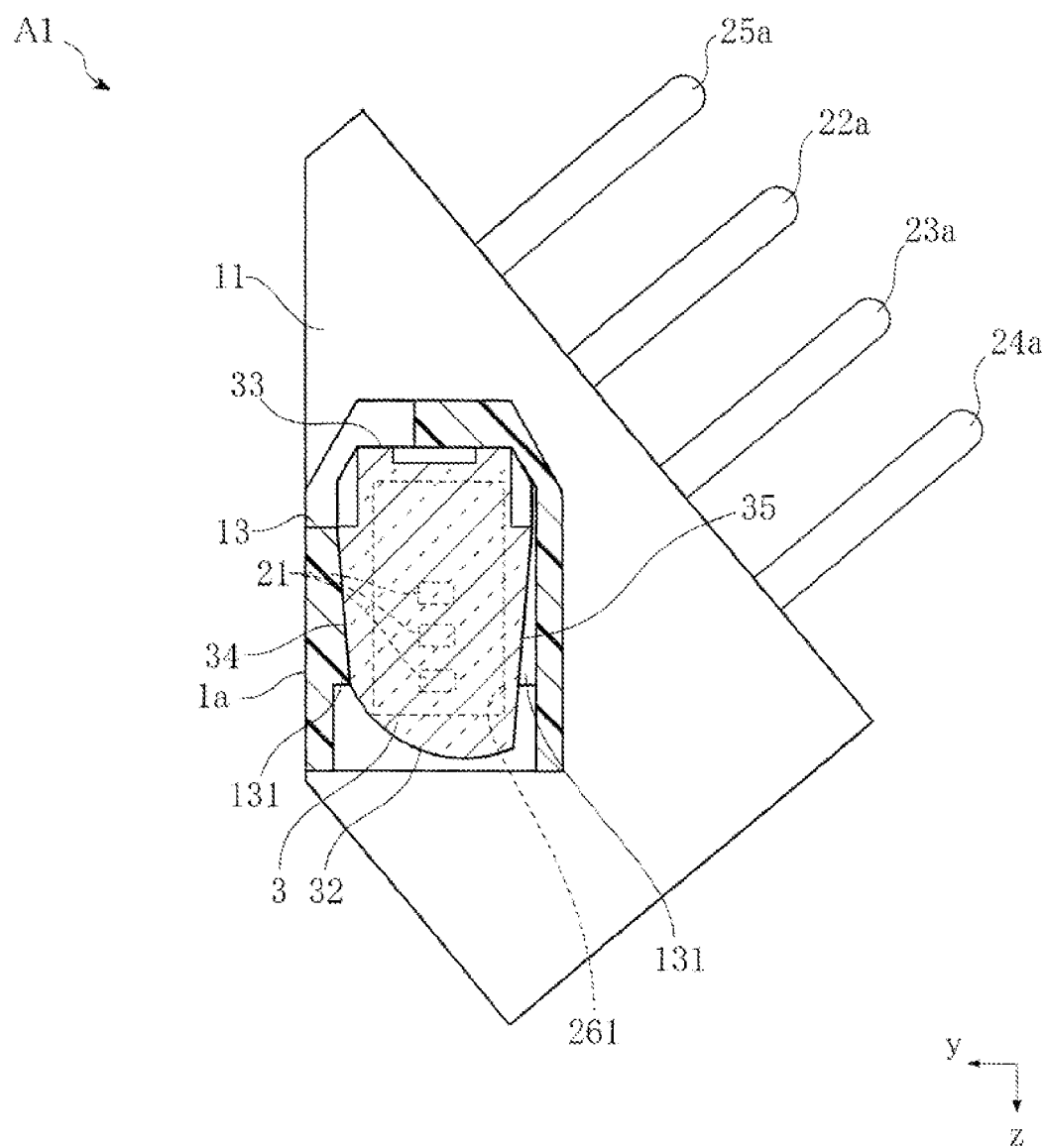
FIG. 8 is a cross-sectional view taken along the arrow VIII-VIII in FIG. 2.

The white case 1 is formed so as to be open at one end in the z-direction over substantially its entire length excluding both ends in the x-direction, and includes, at its one end in the x-direction, a base portion 11 on which the LED unit 2 can be installed, and three engaging rods 12 projecting from the base portion 11 toward one end in the x-direction. The right end face of the base portion 11 in the y-direction in FIG. 1 is integral with the right end face of the white case 1 in the y-direction in FIG. 1, namely, an end face 1a that is perpendicular to the y-direction. As shown in FIGS. 1 and 4, the base portion 11 has an opening 11a for insertion of the light-guiding member 3. Engaging pieces 111 and 112 projecting inward in the y-direction are formed at the other end of the opening 11a in the x-direction. Additionally, as shown in FIG. 2, a plurality of notches 13 and a plurality of recesses 14 are formed on the underside of the white case 1. In the example shown in FIG. 2, four pairs of the notches 13 are disposed in the x-direction. Each pair of the notches 13 is made up of notches 13 that are adjacent in the x-direction and disposed on the right and left lateral edges in the y-direction in FIG. 2. Except for the area where the base portion 11, the plurality of notches 13 and the plurality of recesses 14 are formed, the white case 1 has a substantially uniform cross section over substantially its entire length in the x-direction as shown in FIG. 7. FIG. 8 shows a cross section taken at the portion where the notch 13 is provided.

As shown in FIG. 8, rib portions 131 projecting inward in the y-direction are formed in the portion of the white case 1 where the notches 13 are provided. The rib portions 131 are inclined such that the more toward one side in the z-direction, the greater the amount of projection inward in the z-direction, and this inclination is in conformity with the shape of the light-guiding member 3 described below. The light-guiding member 3 is fixed to the white case 1 by being interposed between the right and left rib portions 131 in the y-direction that are adjacent in the x-direction. Note that in this embodiment, four sets of the right and left rib portions 131 in the y-direction are provided with an appropriate gap in the x-direction, and the white case 1 holds the light-guiding member 3 elongated in the x-direction so as to prevent the light-guiding member 3 from being shifted therewithin. The rib portion 131 disposed in the lower end in the x-direction in FIG. 1 is more elongated inward in the y-direction than the other rib portions 131, and is formed so as to overlap the light-guiding member 3 when viewed from the z-direction. The rib portion 131 prevents the light-guiding member 3 from being detached from the white case 1.

Figure 6:
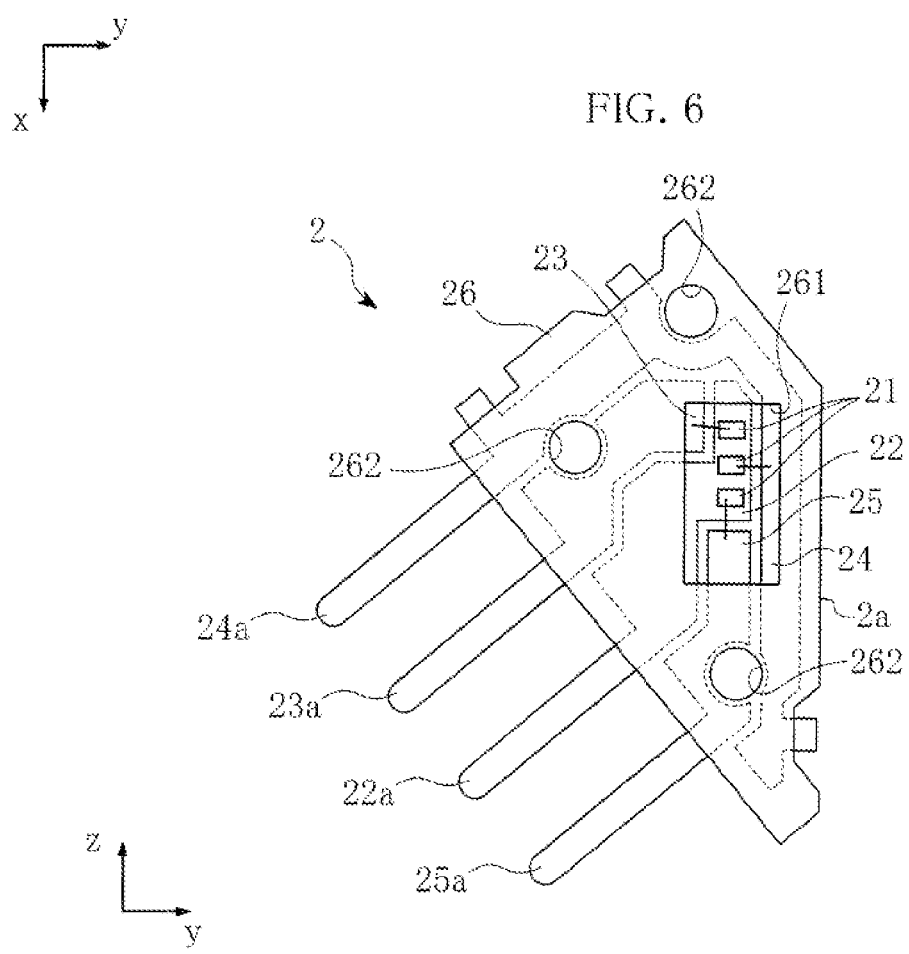
FIG. 6 shows an LED unit according to the present invention.

The LED unit 2 serves as a light source in the present invention, and includes, as shown in FIG. 6, three LED chips 21, four leads 22, 23, 24 and 25, and a LED case 26 for housing these components. The three LED chips 21 are installed on the lead 22 in the z-direction, and respectively emit red light, green light, and blue light mainly in the x-direction. Of the three LED chips 21, the LED chip 21 installed on the uppermost side in the z-direction in FIG. 6 emits red light. The LED chip 21 installed in the middle in the z-direction in FIG. 6 emits green light. The LED chip 21 installed on the lowermost side in the z-direction in FIG. 6 emits blue light. The three LED chips 21 are installed in a narrow area of the lead 22 in a closely-spaced manner such that the light emitted from each of the LED chips 21 more uniformly travels inside the light-guiding member 3 and is emitted as preferred white light.

Figure 5:
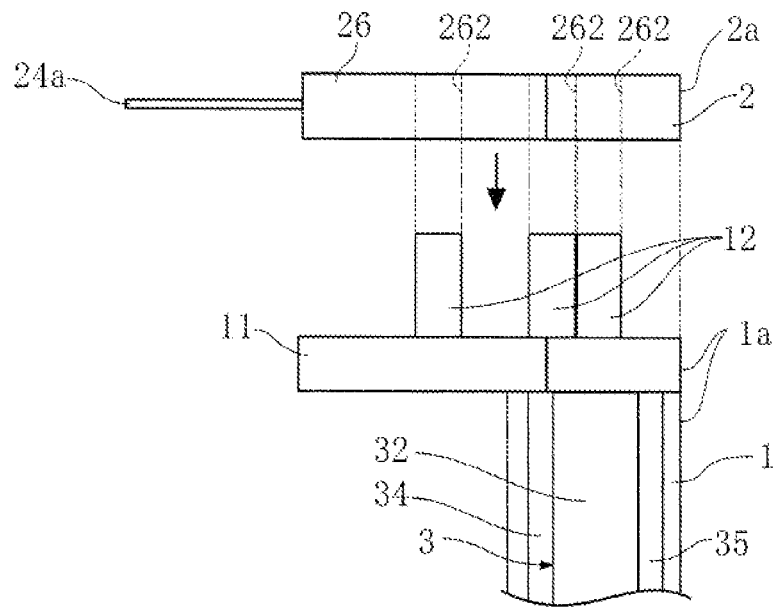
FIG. 5 shows a structure of connection between an LED unit and a white case according to the present invention.

The four leads 22, 23, 24, and 25 are formed so as not to come into contact with each other, and respectively include terminal portions 22a, 23a, 24a, and 25a that project from the LED case 26. In a state in which the linear light source device A1 has been incorporated in the image reading device B, the terminal portions 22a, 23a, 24a, and 25a extend in the z'-direction and are connected to the substrate 6 (see FIG. 13). Additionally, the LED case 26 has a window portion 261 for exposing the three LED chips 21 and three engaging holes 262. The window portion 261 is formed in a long rectangular shape having, for example, a longer side of 3.4 mm and a shorter side of 1.8 mm when viewed in the x-direction. As shown in FIG. 5, the LED, unit 2 is fixed to the base portion 11 by insertion of the engaging rods 12 into the three engaging holes 262.

Although the three LED chips 21 are installed on the lead 22 in the example shown FIG. 6, it is possible to install two LED chips 21 on the lead 22 and install another LED chip 21 on the lead 25.

The right end face 2a of the LED unit 2 in FIG. 1 is perpendicular to the y-direction. In a state where the LED unit 2 is fixed to the base portion 11, the end face 2a is a surface continuous with the end face 1a of the white case 1. The white case 1 and the LED unit 2 having the continuous end faces 1a and 2a are advantageous, for example, in performing the operation of incorporating the linear light source device A1 into the image reading device B.

To produce such an LED unit 2, for example, the following process is performed: a lead frame formed in a predetermined shape is placed in a mold before liquid resin is injected into the mold, and the lead frame is cut after the resin has been hardened. The LED case 26 of this embodiment is formed such that, for example, a portion of its right lateral face in FIG. 6 is recessed in the y-direction, and the cut portion of the lead 24 is allowed to project to the outside from the recessed portion. The amount of projection of the cut portion of the lead 24 is such a length that the cut portion does not project farther to the right in the y-direction than the end face 2a does. Likewise, the LED case 26 is formed such that a portion thereof is recessed also in an inclined surface formed on the left side in the y-direction and the upper side in the z-direction in FIG. 6 and the cut portion of the lead 24 is allowed to project from the recessed portion. Due to this configuration, the projecting portions of the lead 24 do not obstruct the operation of incorporating the LED unit 2 in the case 7, and therefore the assembly operation can be performed smoothly.

As shown in FIG. 1, the light-guiding member 3 is incorporated in the white case 1 such that one end portion 31 in the x-direction faces the LED chips 21, and is formed, for example, of acrylic resin and in the shape of an elongated rod extending in the x-direction. The light-guiding member 3 has a dimension in the x-direction of 224.5 mm, for example. The end portion 31 includes engaging pieces 311 and 312 for engaging with the engaging pieces 111 and 112, and is fixed by being interposed between the base portion 11 and the LED case 26. The engaging pieces 311 and 312 have a dimension in the x-direction of 0.2 mm, for example.

The light-guiding member 3 has a dimension in the z-direction of 4.0 mm, for example, and includes, at its one end in the z-direction, a light exit portion 32 that is exposed from the white case 1 and from which light introduced from the end portion 31 is emitted to the outside. As shown in FIG. 11, the cross sectional shape of the light exit portion 32 constitutes a part of a circle. The center of the circle forming the cross section of the light exit portion 32 is in a position that is offset to one side in the y-direction relative to a center line L1 of the light-guiding member 3. The light exit portion 32 includes a first exit surface 32a provided toward one side in the y-direction relative to the center line L1 and a second exit surface 32b provided toward the other side. The angle between the center line L1 and a line La connecting one end of the first exit surface 32a in the y-direction to the other end is greater than the angle between the center line L1 and a line Lb connecting one end of the second exit surface 32b in the y-direction to the other end.

Figure 3:
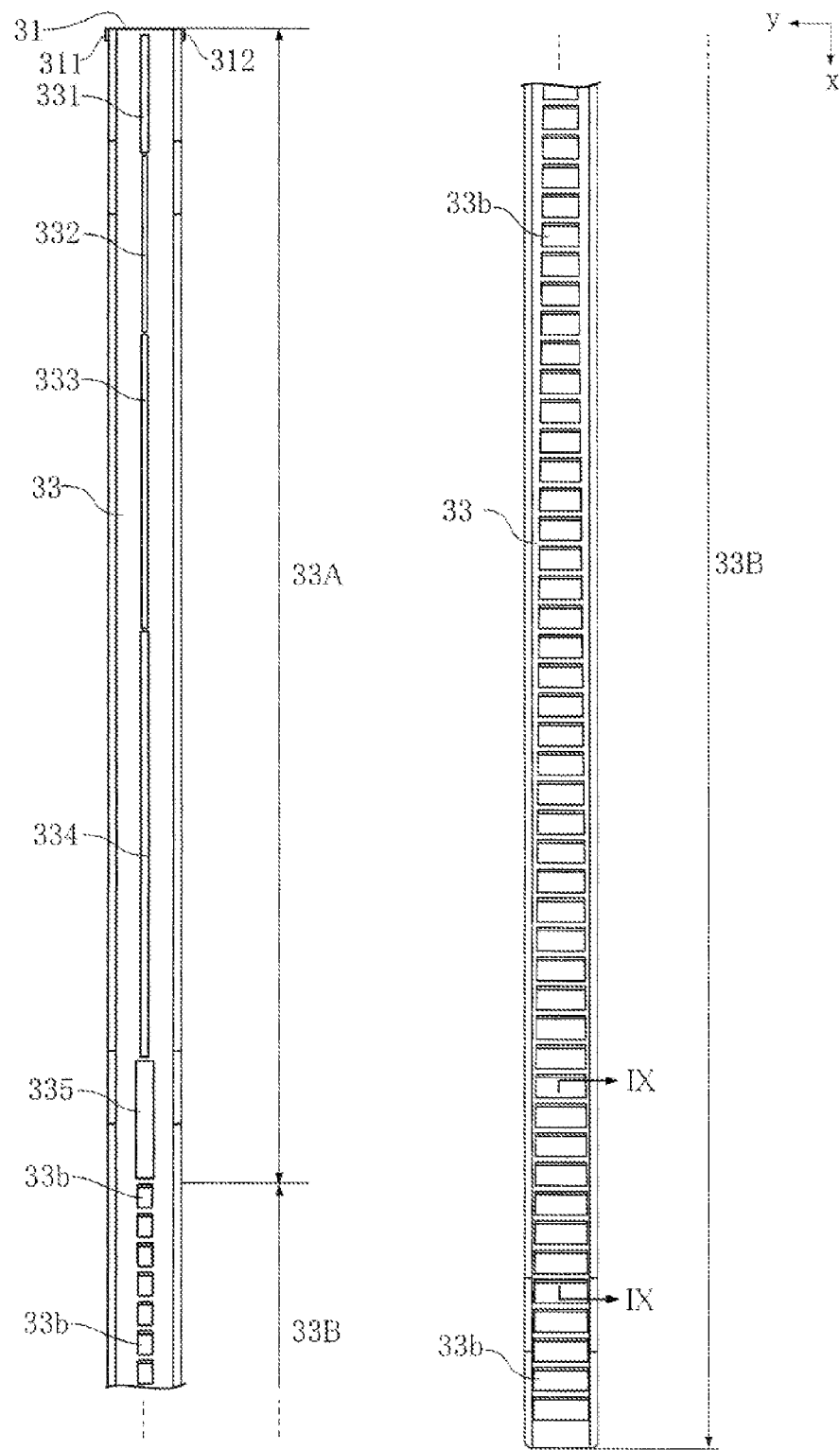
FIG. 3 is a partial enlarged view of the light-guiding member shown in FIG. 2.

The light-guiding member 3 includes, at the other end in the z-direction, a light-reflecting portion 33 formed in a substantially long rectangular shape when viewed in the z-direction, having a dimension in the y-direction of 1.96 mm, for example, and extending over substantially its entire length in the x-direction. As shown in FIGS. 2 and 3, the light-reflecting portion 33 includes a scattering surface formation area 33A in which five scattering surfaces 331, 332, 333, 334, and 335 are formed and a recess formation area 33B in which a plurality of recesses 33b are formed. The scattering surface formation area 33A extends over a length of 39.15 mm from one end of the light-reflecting portion 33 in the x-direction. The recess formation area 33B is an area extending from the other end of the scattering surface formation area 33A in the x-direction to the other end portion of the light-reflecting portion 33.

The five scattering surfaces 331, 332, 333, 334, and 335 are surfaces formed, for example, by etching the central portion of the light-reflecting portion 33 in the y-direction to form fine irregularities. The five scattering surface 331, 332, 333, 334, and 335 are formed in rectangular shapes, as viewed in the z-direction, that have different dimensions from one another, and are aligned in order from one end portion in the x-direction. The scattering surface 331 is disposed such that one end in the x-direction is located away from the end portion 31 by 0.2 mm, and has a dimension in the x-direction of 4 mm and a dimension in the y-direction of 0.27 mm. The scattering surface 332 has a dimension in the x-direction of 6 mm and a dimension in the y-direction of 0.18 mm. The scattering surface 333 has a dimension in the x-direction of 10 mm and a dimension in the y-direction of 0.216 mm. In the x-direction, the interval between the scattering surface 331 and the scattering surface 332, the interval between the scattering surface 332 and the scattering surface 333, and the interval between the scattering surface 333 and the scattering surface 334 are 0.1 mm. The scattering surface 334 has a dimension in the x-direction of 14.5 mm and a dimension in the y-direction of 0.27 mm. The scattering surface 335 is located away from the scattering surface 334 by 0.15 mm, and has a dimension in the x-direction of 4 mm and a dimension in the y-direction of 0.6 mm. The dimensions in the x- and y-directions of each of the scattering surfaces 331, 332, 333, 334, and 335 are adjusted such that the quantity of light emitted from the light exit portion 32 is uniform in the x-direction.

The recess 33b in the end of the recess formation area 33B on one side in the x-direction is formed in a position located away from the end of the scattering surface 335 on the other side in the x-direction by 0.2 mm. The length of the plurality of recesses 33b in the x-direction is constant, and the interval between the adjacent recesses 33b in the x-direction is smaller than the length of each recess 33b in the x-direction. Specifically, each of the plurality of recesses 33b has a dimension in the x-direction of 0.8 mm, and is formed in the x-direction with an interval of 0.2 mm. In other words, in this embodiment, the plurality of recesses 33b occupy about 80% of the recess formation area 33B in the x-direction.

Figure 9:
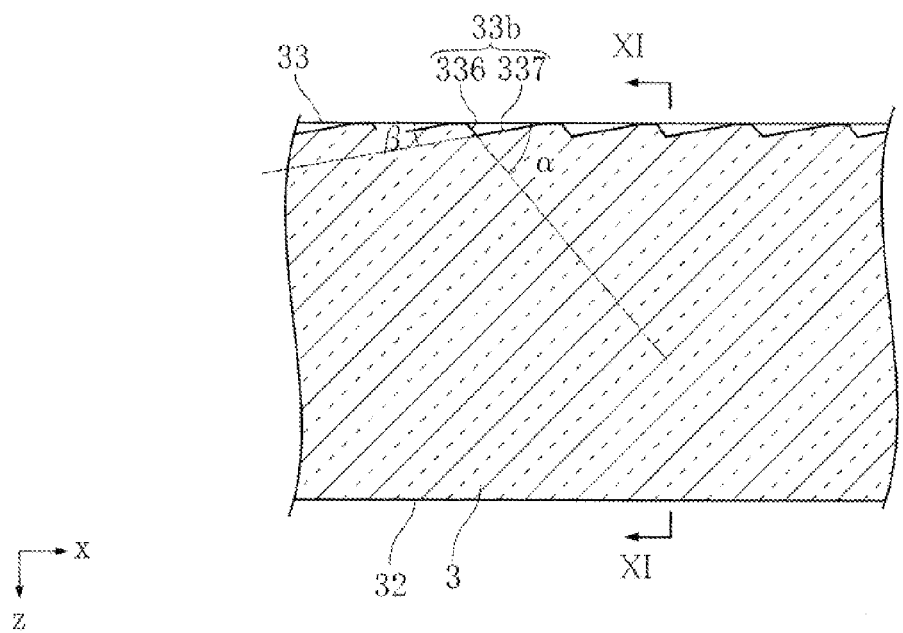
FIG. 9 is a cross-sectional view taken along the arrow IX-IX in FIG. 3.

As shown in FIGS. 2 and 3, the plurality of recesses 33b are formed such that their dimension in the y-direction increases the farther toward the other end in the x-direction they are disposed. As shown in FIG. 9, each of the recesses 33b is made up of a first inclined surface 336 provided toward one side in the x-direction and a second inclined surface 337 provided toward the other side. The angle α between the first inclined surface 336 and a flat portion of the light-reflecting portion 33 is 50°, for example. The angle β between the second inclined surface 337 and a flat portion of the light-reflecting portion 33 is 10°, for example. Accordingly, the dimension in the x-direction of the first inclined surface 336 is smaller than the dimension in the x-direction of the second inclined surface 337.

As stated above, the structure of the light-reflecting portion 33 gradually changes in the y-direction, but the portion of the light-guiding member 3 excluding the end portion 31 has a substantially uniform cross section in the x-direction as shown in FIG. 11. As shown in FIG. 11, one end face 34 of the light-guiding member 3 in the y-direction is inclined so as to become closer to the other end face 35 in the y-direction with decreasing distance from the light exit portion 32 in the z-direction. The end face 35 is inclined so as to become closer to the end face 34 with decreasing distance from the light exit portion 32 in the z-direction. The angle of inclination of the end faces 34 and 35 to the center line L1 is 5°, for example.

As shown in FIG. 8, in the portion where the notch 13 and the rib portion 131 are formed, the end face 34 is in contact with the rib portion 131. In the case where the rib portions 131 are provided in the opposite end in the y-direction as compared to the case shown in FIG. 8, the end face 35 is in contact with the rib portion 131. On the other hand, in the portion where the notch 13 and the rib portion 131 are not provided, as shown in FIG. 7, there are gaps between the end faces 34 and 35 and both lateral faces of the case 1 in the y-direction, and therefore the end faces 34 and 35 will not come into close contact with the white case 1.

In the linear light source device A1, light that is emitted from each of the LED chips 21 is introduced into the light-guiding member 3 from the end portion 31, and the light travels inside the light-guiding member 3 in the x-direction, while being reflected. In this embodiment, the portion of the light-guiding member 3 other than the light exit portion 32 is covered by the white case 1, and therefore any component of the light travelling inside the light-guiding member 3 that is emitted from the portion of the light-guiding member 3 other than the light exit portion 32 to the outside of the light-guiding member 3 will return to the inside of the light-guiding member 3. Part of the light travelling inside the light-guiding member 3 in the x-direction while being reflected is reflected in the z-direction by the light-reflecting portion 33, and emitted from the light exit portion 32. Due to this configuration, band-shaped light elongated in the x-direction is emitted by the linear light source device A1 in the z-direction. As shown in FIG. 13, the linear light source device A1 is obliquely fixed to the case 7. Specifically, the angle between the center line L1 and the y'-direction is 40°. The case 7 is provided with projecting pieces (not shown) corresponding to the plurality of notches 13 and the plurality of recesses 14. The case 7 and the linear light source device A1 are fixed together, for example, by fitting the linear light source device A1 in the y-direction into the case 7 using these projecting pieces. The light emitted from the linear light source device A1 illuminates the document G placed on the glass cover 8. The lens array 4 and the light-receiving element 5 are installed in a lower position in the z'-direction than that of the area of the document G that is illuminated by the linear light source device A1. Light that has been reflected by the document G is converged to the light-receiving element 5 by the lens array 4. The light-receiving element 5 is made up of a plurality of photoelectric conversion elements aligned in the x-direction. The substrate 6 for mounting the light-receiving element 5 is assembled on the lower end portion of the case 7 in the z'-direction. The substrate 6 also includes a wiring pattern (not shown) for establishing electrical conduction with the terminal portions 22a, 23a, 24a, and 25a to supply power to the three LED chips 21.

Next, the operation of the linear light source device A1 and the image reading device B will be described.

According to this embodiment, the end faces 34 and 35 of the light-guiding member 3 in the y-direction are formed so as to be inclined, and, as shown in FIG. 11, for example, light that is incident on the end face 35 in the y-direction is reflected to the light-reflecting portion 33. For this reason, light travelling perpendicular to the z-direction, which would not proceed to the light-reflecting portion 932 in the conventional linear light source device 90, can be guided to the light-reflecting portion 33 by the light-guiding member 3. Accordingly, the linear light source device A1 facilitates an increase in the quantity of light reaching the light-reflecting portion 33 and being reflected in the z-direction, which increases the quantity of light emitted from the light exit portion 32 as well, thus making it possible to supply an increased quantity of light to the document G.

Furthermore, in this embodiment, the end faces 34 and 35 are spaced away from the white case 1 in most of their portions in the x-direction (see FIG. 7). Accordingly, light that is to be reflected by the end faces 34 and 35 will not be improperly scattered by the white case 1, and such a configuration is preferable in achieving the above-described effect.

In the vicinity of the end portion 31 in the light-guiding member 3 in the x-direction, the light from the LED unit 2 is incident on the light-reflecting portion 33 with a relatively small angle of incidence, and therefore tries to exit from the light-guiding member 3 to the outside without being totally reflected by the light-reflecting portion 33. Because the white case 1 is placed outside the light-reflecting portion 33, the light that has exited from the light-reflecting portion 33 to the outside is scattered back into the light-guiding member 3 by the white case 1 and then emitted from the light exit portion 32. Scattering caused by the white case 1 tends not to vary due to the position in the x-direction. If the quantity of light traveling to the light-reflecting portion 33 is not constant in the x-direction, the quantity of light emitted from the light exit portion 32 also varies in the x-direction. Therefore, in this embodiment, the five scattering surfaces 331, 332, 333, 334, and 335 are formed in the vicinity of the LED unit 2 in the x-direction such that the quantity of light emitted from the light exit portion 32 is more uniform in the x-direction. Because each of the scattering surfaces 331, 332, 333, 334, and 335 serve to scatter light by their irregularities, the travelling path of the scattered light is different from that in the case of scattering caused by the white case 1. By aligning the scattering surfaces 331, 332, 333, 334, and 335 of different sizes in the x-direction, it is possible to adjust the quantity of light emitted from the light exit portion 32. Accordingly, the linear light source device A1 has a configuration that facilitates emission of light in a uniform quantity in the x-direction.

On the other hand, the light reaching a position that is distant from the LED unit 2 in the x-direction tends to be made incident on the light-reflecting portion 33 with an angle of incidence greater than a total reflection angle. In this case, if the light-reflecting portion 33 is not subjected to any processing, the light incident on the light-reflecting portion 33 is totally reflected to proceed further in the x-direction, and is totally reflected by the light exit portion 32 as well, and therefore will not exit from the light-guiding member 3 to the outside. For this reason, the light-reflecting portion 33 according to this embodiment is provided with the plurality of recesses 33b, whose widths in the y-direction increase the farther they are disposed from the LED unit 2 in the x-direction, and thus is configured such that light having a uniform quantity in the x-direction can be emitted.

As shown in FIG. 10, light incident on the first inclined surface 336 of each of the recesses 33b with an angle of incidence smaller than a total reflection angle is emitted to the outside of the light-guiding member, and scattered by the white case 1. Any component of the light scattered by the white case 1 that is incident on the second inclined surface 337 with an angle of incidence smaller than a total reflection angle reenters the light-guiding member 3. Because the light reflected by the second inclined surface 337 is re-scattered by the white case 1, substantially all the light that has exited from the first inclined surface 336 to the outside of the light-guiding member 3 consequently returns into the light-guiding member 3 as light that cannot be totally reflected by the second inclined surface 337. Part of the light returning into the light-guiding member 3 through the second inclined surface 337 travels in the z-direction, reaches the light exit portion 32 with an angle of incidence greater than a total reflection angle, and is emitted to the outside.

Because the first inclined surface 336 is formed standing perpendicularly to the x-direction, the light travelling in the x-direction can be easily emitted to the outside of the light-guiding member 3. Accordingly, each of the recesses 33b has the function of converting the light that cannot easily travel in the z-direction into light proceeding to the light exit portion 32 by using the scattering caused by the white case 1. The effect of this function increases with an increase in the area of the recesses 33b as viewed in the z-direction. In this embodiment, the recesses 33b have a greater width in the y-direction the farther they are disposed from the LED unit 2 in the x-direction. Accordingly, light attenuation caused by distance can be compensated for, and therefore the light emitted from the light exit portion 32 tends to have a uniform quantity in the x-direction.

Furthermore, the plurality of recesses 33b are aligned with a relatively small interval in this embodiment, and therefore a relatively large area in which the scattering caused by the white case 1 is secured. This is advantageous in increasing the quantity of light emitted to a position that is distant from the LED unit 2 in the x-direction.

In this embodiment, the length in the x-direction and the depth in the z-direction of the plurality of recesses 33b are constant. Accordingly, in the case of forming the light-guiding member 3 by using a mold, for example, the mold can be easily processed.

In this embodiment, the emission of light to the outside of the light-guiding member 3 is regulated by the first inclined surface 336, and therefore not all the light incident on each of the recesses 33b is subjected to the scattering caused by the white case 1. Accordingly, even if the length in the x-direction of each of the recesses 33b is increased, the quantity of light reaching a position that is distant from the LED unit 2 in the x-direction will not be reduced excessively. Therefore, the length in the x-direction of each recess 33b can be increased. If the length in the x-direction of each recess 33b is increased, the light returning from the second inclined surface 337 into the light-guiding member 3 is diffused in a longer area in the x-direction, which makes it possible to prevent the light emitted from the light exit portion 32 from being too bright only in a specific position.

Furthermore, the second exit surface 32b is formed so as to be inclined to the z-direction in this embodiment, and therefore the light emitted from the second exit surface 32b tends to be bent so as to follow the center line L1, as shown in FIG. 13. Accordingly, the light emitted from the second exit surface 32b tends not to be blocked by the lens array 4 and thus can easily reach the document G. On the other hand, the first exit surface 32a is almost perpendicular to the z-direction, and therefore the light emitted from the first exit surface 32a can illuminate a relatively wide area in the y'-direction. Accordingly, the linear light source device A1 has a configuration that can illuminate a relatively wide area in the y'-direction with light in the form of a band and can prevent a reduction in light quantity resulting from a partial loss of light caused by to the lens array 4.

Furthermore, in this embodiment, the position in the y-direction of the linear light source device A1 in the image reading device B is fixed by fitting the projecting pieces (not shown) provided in the case 7 into the notches 13. With this fixation method, a force in the y-direction is applied to the linear light source device A1 in only a specific portion where the notches 13 are formed in the x-direction. In this case, because of the gap between the inner face of the white case 1 and the light-guiding member 3 as shown in FIG. 7, the problem of deformation of the white case 1 or the light-guiding member 3 can be envisaged. In this embodiment, the rib portions 131 are formed in the portion where the notches 13 are formed in the x-direction as shown in FIG. 8 and the light-guiding member 3 and the white case 1 come into contact with each other, thus also obviating the above-mentioned problem.

With the image reading device B, even if the document G is suspended in the air in the z'-direction, the linear light source device A1 can provide bright light to a relatively wide area of the document G, and therefore reading can be performed appropriate.

FIGS. 14 to 19 show another other embodiment of the present invention. Note that elements that are the same as or similar to the elements in the above-described embodiments are denoted by the same reference numeral in FIGS. 14 to 19, and the description thereof is omitted where appropriately.

Figure 14:
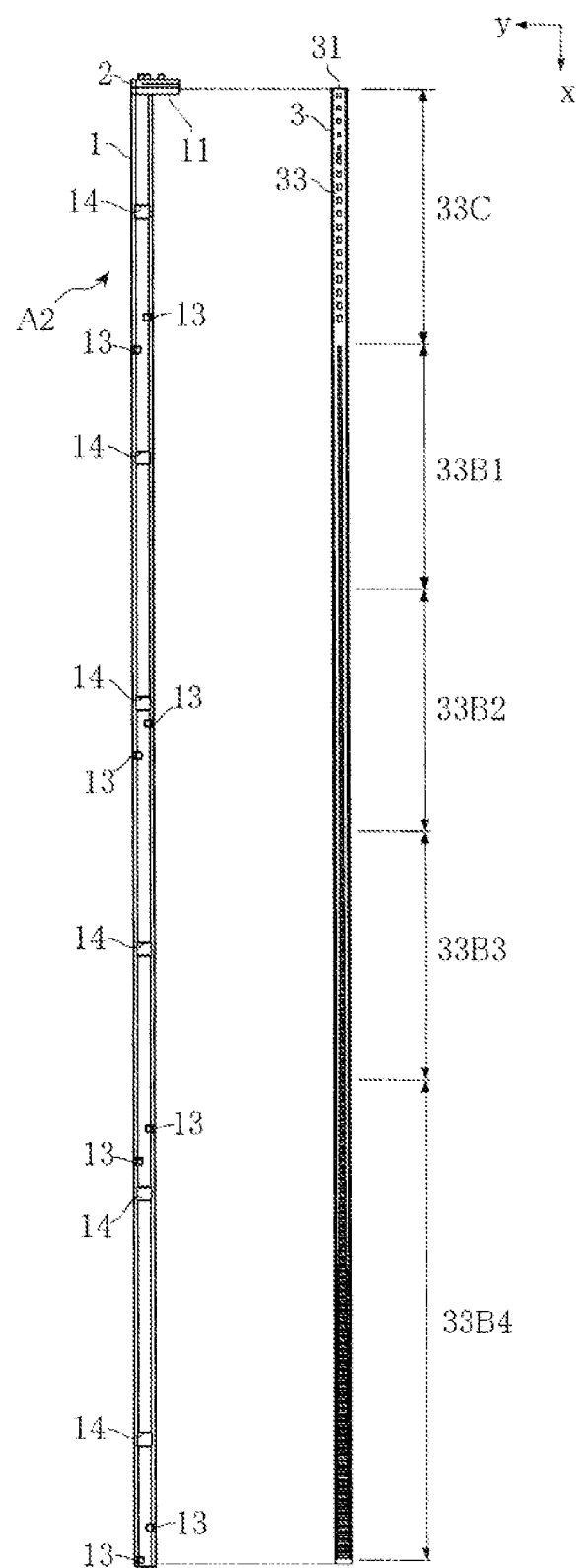
FIG. 14 is a bottom view of a linear light source device according to a second embodiment of the present invention.

FIGS. 14 to 19 show a linear light source device according to a second embodiment of the present invention. As shown in FIG. 14, a linear light source device A2 is to be incorporated into the image reading device B, as in the case of the linear light source device A1. In the following, the difference between the linear light source device A2 and the linear light source device A1 will be described.

Figure 16:
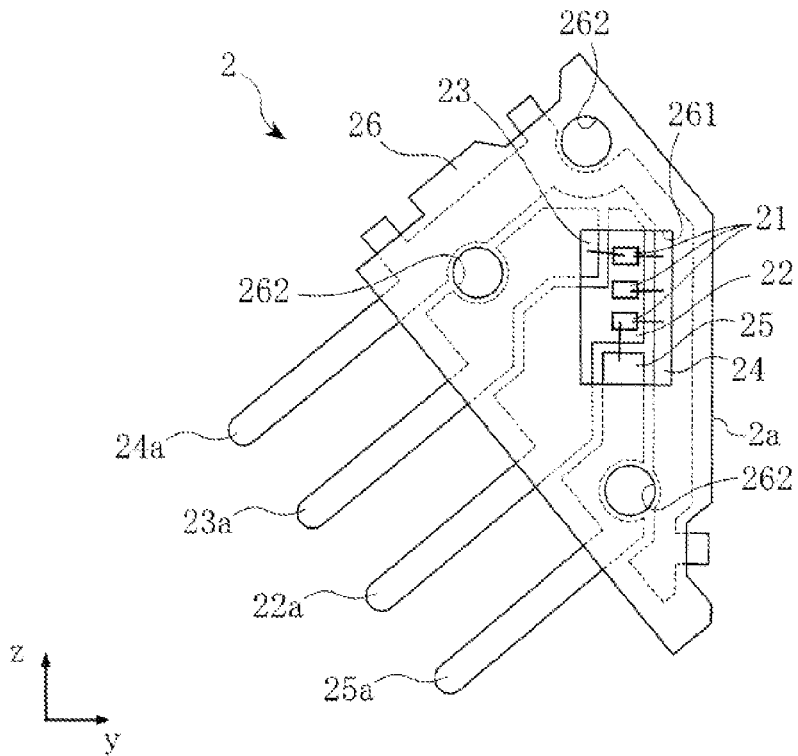
FIG. 16 shows the LED unit shown in FIG. 14.

FIG. 16 shows an LED unit 2 of the linear light source device A2. As shown in FIG. 16, three LED chips 21 are mounted to a lead 22, and each of the LED chips 21 is connected to a lead 24 via a wire. Of the three LED chips 21, the LED chip 21 located on the upper side in the z-direction in FIG. 16 is in electrical conduction with a lead 23 via a wire. The LED chip 21 located on the lower side in the z-direction in FIG. 16 is in electrical conduction with a lead 25 via a wire. The LED chip 21 that is located in the middle in the z-direction is in electrical conduction with a lead 22. A window portion 261 for exposing the LED chips 21 is formed in a long rectangular shape having a longer side of 2.83 mm and a shorter side of 1.8 mm when viewed in the x-direction.

Figure 17:
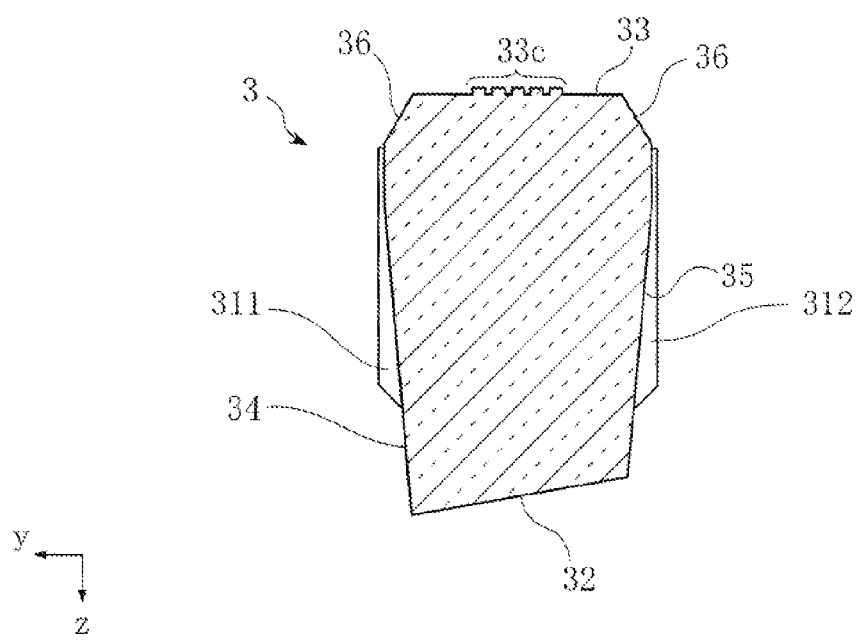
FIG. 17 is a cross-sectional view taken along the arrow XVII-XVII in FIG. 15.

As shown in FIG. 17, a light exit portion 32 according to this embodiment constitutes a flat surface connecting the lower ends of end faces 34 and 35 in FIG. 17. The end face 34 extends further down in the z-direction than the end face 35 does in FIG. 17. The light exit portion 32 is inclined so as to become more distant from the light-reflecting portion 33 in the z-direction with decreasing distance from the end face 34 in the y-direction. The light exit portion 32 is inclined to the y-direction by 10°, for example. Such a light exit portion 32 can achieve the same effect as that of the second exit surface 32b of the linear light source device A1.

Figure 15:
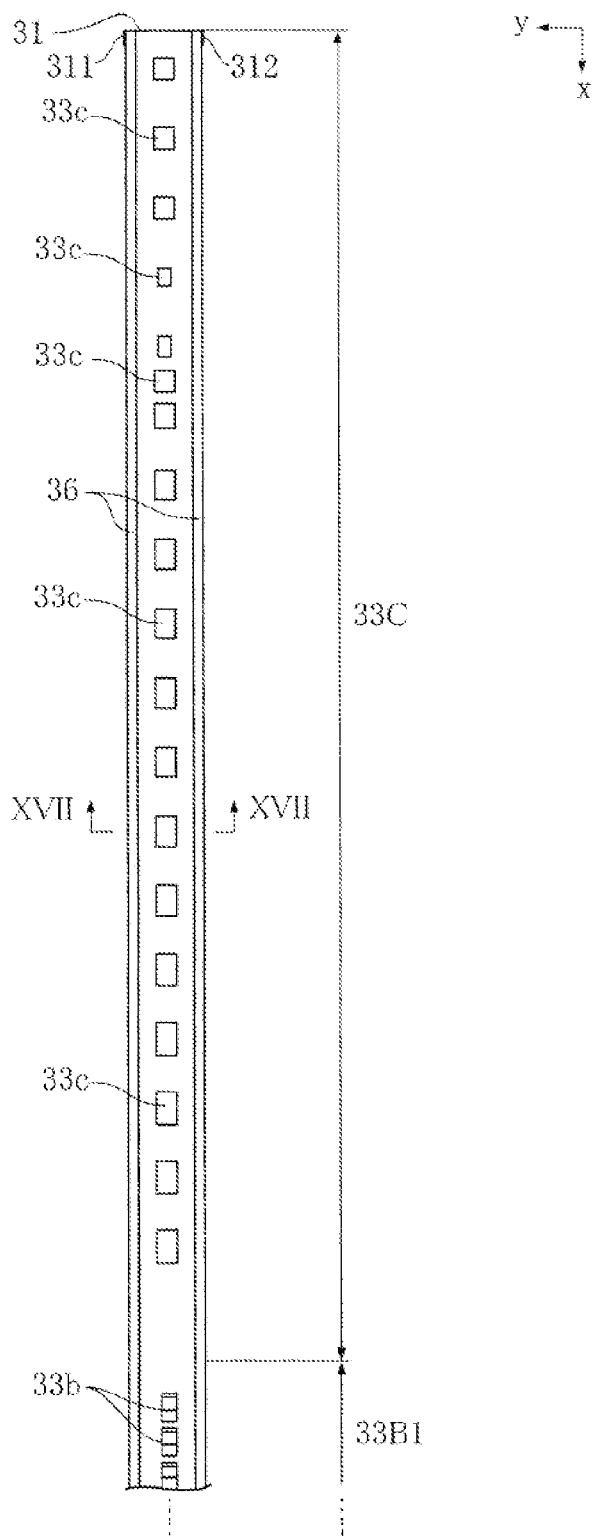
FIG. 15 is a partial enlarged view of the light-guiding member shown in FIG. 14.

As shown in FIG. 14, a light-reflecting portion 33 of the linear light source device A2 includes a scattering surface formation area 33C and recess formation areas 33B1 to B4. The scattering surface formation area 33C is a band-shaped area extending from an end portion 31 in the x-direction, which corresponds to the scattering surface formation area 33A of the linear light source device A1, and has a length in the x-direction of 39.35 mm. As shown in FIG. 15, a plurality of scattering surfaces 33c are aligned in the scattering surface formation area 33C, in place of the scattering surfaces 331, 332, 333, 334, and 335. As shown in FIG. 17, a plurality of projections are formed in each of the scattering surfaces 33c. Such a scattering surface 33c can be formed, for example, by etching a mold used for formation of the light-guiding member 3.

The recess formation areas 33B1 to B4 each correspond to the recess formation area 33B of the linear light source device A1, and include a plurality of recesses 33b aligned in the x-direction as shown in FIG. 15. In the recess formation areas 33B1 to B4, the plurality of recesses 33b are aligned in the same manner as the plurality of recesses 33b in the recess formation area 33B of the linear light source device A1. Also, the recesses 33b have a greater width in the y-direction the farther they are disposed from the end portion 31 in the x-direction, as in the case of the recesses 33b of the linear light source device A1.

Figure 18:
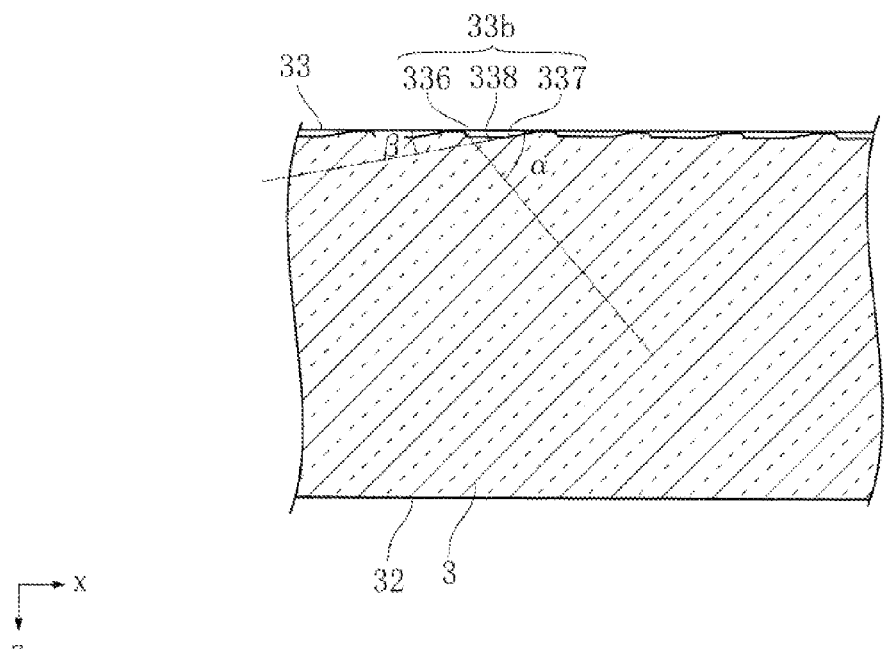
FIG. 18 is a cross-sectional view for illustrating a recess formation area of the linear light source device shown in FIG. 14.
Figure 19:
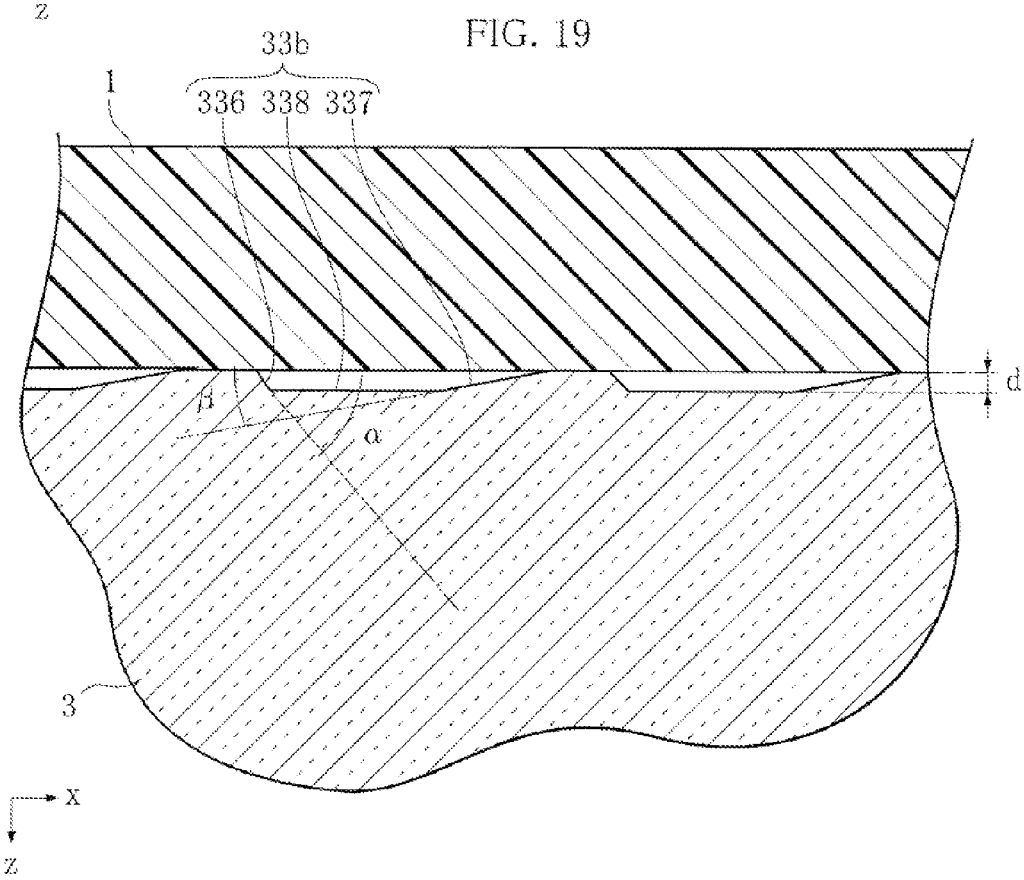
FIG. 19 is an enlarged view of a principal part of FIG. 18.
Figure 20:
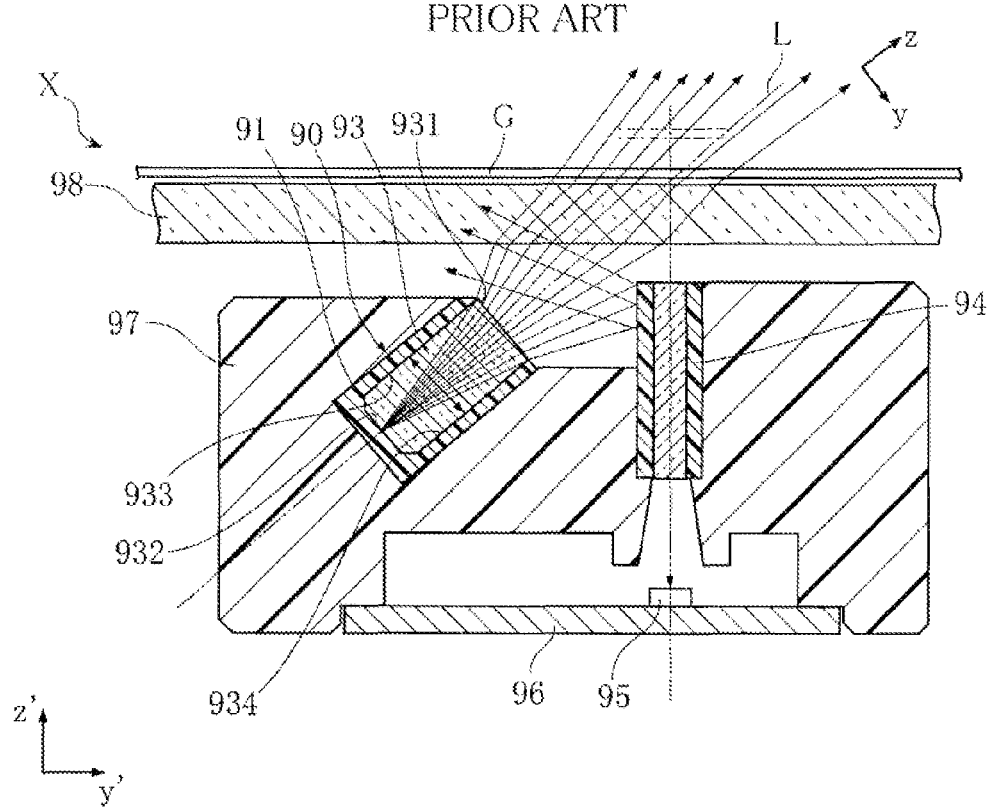
FIG. 20 is a cross-sectional view of an example of a conventional image reading device.
Figure 21:
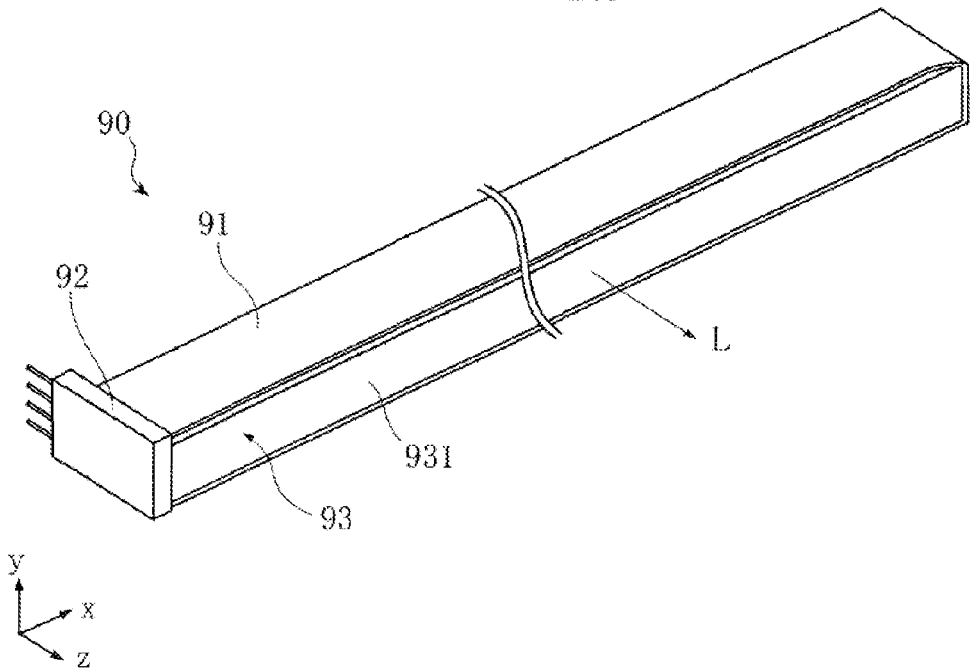
FIG. 21 is a perspective view of an example of a conventional linear light source device.

As shown in FIGS. 18 and 19, each of the recesses 33b in this embodiment includes a first inclined surface 336, a second inclined surface 337, and a bottom face 338 located between the first inclined surface 336 and the second inclined surface 337. The bottom face 338 constitutes a surface perpendicular to the z-direction. As shown in FIG. 19, the interval between the bottom face 338 and the white case 1 is defined as the depth d of the recess 33b. In this embodiment, the recess formation areas 33B1 to B4 have different depths d.

As shown in FIG. 14, the recess formation area 33B1 is a band-shaped area adjacent to the scattering surface formation area 33C, and has a length in the x-direction of 37 mm. The depth d of each recess 33b formed in the recess formation area 33B1 is 0.04 mm. Note that in this embodiment as well, the angle α between the first inclined surface 336 and a flat portion of the light-reflecting portion 33 is 50°, for example. The angle β between the second inclined surface 337 and a flat portion of the light-reflecting portion 33 is 10°, for example.

As shown in FIG. 14, the recess formation area 33B2 is a band-shaped area adjacent to the recess formation area 33B1, and has a length in the x-direction of 37 mm. The depth d of each recess 33b formed in the recess formation area 33B2 is 0.05 mm. The length in the x-direction of the bottom face 338 in the recess formation area 33B2 is smaller than that in the recess formation area 33B1.

As shown in FIG. 14, the recess formation area 33B3 is a band-shaped area adjacent to the recess formation area 33B2, and has a length in the x-direction of 37 mm. The depth d of each recess 33b formed in the recess formation area 33B3 is 0.07 mm. The length in the x-direction of the bottom face 338 in the recess formation area 33B3 is smaller than that in the recess formation area 33B2.

As shown in FIG. 14, the recess formation area 33B4 is a band-shaped area adjacent to the recess formation area 33B3, and has a length in the x-direction of 73.8 mm. The depth d of each recess 33b formed in the recess formation area 33B4 is 0.08 mm. The length in the x-direction of the bottom face 338 in the recess formation area 33B4 is smaller than that in the recess formation area 33B3.

In the linear light source device A1, the plurality of recesses 33b are provided to effectively use the scattering effect of the white case 1. On the other hand, the recesses 33b can reduce the function of causing the light from the LED unit 2 to travel to a distant position in the x-direction. For this reason, depending on the performance of the LED unit 2, the quantity of light emitted from the light exit portion 32 at a position distant from the end portion 31 of the light-guiding member 3 in the x-direction may be reduced. In the case of the plurality of recesses 33b in the linear light source device A2, the bottom face 338 is provided to reduce the area of the first inclined surface 336 as viewed in the x-direction, thus suppressing the occurrence of the above-mentioned problem. Furthermore, in this embodiment, the recesses 33b have a greater depth d the farther they are disposed from the end portion 31 in the x-direction, and therefore the area of the first inclined surface 336 as viewed in the x-direction increases the farther they are disposed. For the recess formation area 33B1, it is important to send light to a position that is further distant in the x-direction by suppressing scattering. Conversely, for the recess formation area 33B4, it is important to increase the quantity of light emitted from the light exit portion 32 by increasing the scattering effect of the recesses 33b.

In this embodiment, a pair of band-shaped scattering surfaces 36 connecting the light-reflecting portion 33 to the end faces 34 and 35 are provided over substantially the entire length of the light-guiding member 3 in the x-direction. The pair of band-shaped scattering surfaces 36 constitute inclined surfaces that are inclined so as to be increasingly spaced away from each other in the y-direction with increasing distance from the light-reflecting portion 33 in the z-direction. For example, fine irregularities are formed all over the entire band-shaped scattering surfaces 36, and thereby incident light is scattered. Such a band-shaped scattering surface 36 can be relatively easily formed, for example, by previously rubbing an appropriate portion of a mold used for formation of the light-guiding member 3 using a file or the like.

In the light-reflecting portion 33, the plurality of scattering surfaces 33c and the plurality of recesses 33b are arranged in a discontinuous manner. Accordingly, there may be a portion where the light that is intermittently emitted from the light exit portion 32 in the x-direction is attenuated. The band-shaped scattering surfaces 36 are continuous in the x-direction and thus can solve the above-mentioned problem.

Although a pair of band-shaped scattering surfaces 36 are provided in this embodiment, it is possible for only one of the inclined surfaces to be configured as a scattering surface.

The linear light source device and the image reading device according to the present invention are not limited to the above-described embodiments. Various design modifications can be made for the specific configuration of the portions of the linear light source device and the image reading device according to the present invention. For example, although both of the end faces 34 and 35 are inclined in the above-described embodiments, it is possible to adopt a configuration in which one of the end faces 34 and 35 is inclined and the other is standing perpendicular to the light-reflecting portion 33.

Although the scattering surfaces 331, 332, 333, 334, and 335 are formed in the scattering surface formation area 33A in the above-described embodiments, the structure of the scattering surface formation area 33A may be appropriately adjusted according to the performance of the LED unit 2.

Although the scattering surfaces 331, 332, 333, 334, and 335 are formed by etching in the above-described embodiments, they may be formed, for example, by blasting. Furthermore, the scattering surfaces 331, 332, 333, 334, and 335 can be formed into scattering surfaces through application of white coating material by printing, rather than through formation of projections and recesses.

Furthermore, although the cross sectional shape of the light exit portion 32 constitutes a part of a circular arc in the above-described embodiments, the cross sectional shape of the light exit portion 32 is not limited to a circular arc, and the first and second exit surfaces 32a and 32b may be separate curved surfaces or separate flat surfaces.

The invention claimed is:

1. A linear light source device comprising:
a light source; and
a light-guiding member that introduces light emitted from the light source from one end portion in a first direction, causes the light to travel in the first direction, and emits the light from a light exit portion provided at one end in a second direction orthogonal to the first direction;
the light-guiding member comprising, at another end in the second direction, a light-reflecting portion that reflects light to the light exit portion,
wherein one end face of the light-guiding member in a third direction orthogonal to the first direction and the second direction is inclined so as to become closer to another end face in the third direction with decreasing distance from the light exit portion in the second direction,
wherein the light-reflecting portion comprises a plurality of recesses arranged in the first direction, and
each of the recesses includes a first inclined surface that is inclined so as to become closer to the light exit portion in the second direction with increasing distance from the light source in the first direction and a second inclined surface that is inclined so as to become more distant from the light exit portion in the second direction with increasing distance from the light source in the first direction,
wherein, in each of the recesses, a length in the first direction of the second inclined surface is greater than a length in the first direction of the first inclined surface,
wherein the plurality of recesses are formed such that a width thereof in the third direction increases the farther a position thereof from the light source in the first direction, and
wherein the light-reflecting portion includes a plurality of scattering surfaces for scattering light from the light source, the plurality of scattering surfaces being arranged closer to the light source than the plurality of recesses in the first direction, the plurality of scattering surfaces being arranged in a row extending in the first direction and each of the scattering surfaces having a different length measured in the first direction.

2. The linear light source device according to claim 1, wherein the other end face of the light-guiding member in the third direction is inclined so as to become closer to the one end face in the third direction with decreasing distance from the light exit portion in the second direction.

3. The linear light source device according to claim 1, wherein each of the recesses includes a bottom face being perpendicular to the second direction and being disposed between the first inclined surface and the second inclined surface in the first direction.

4. The linear light source device according to claim 3, wherein the plurality of recesses are formed such that a length in the first direction of the first inclined surface increases the farther a position thereof from the light source in the first direction.

5. The linear light source device according to claim 1, wherein the light exit portion comprises a first exit surface provided toward one side in the third direction and a second exit surface provided toward another side in the third direction, and a first angle between a line in the second direction and a line connecting one end portion to another end portion of the first exit surface in the third direction is different from a second angle between a line in the second direction and a line connecting one end portion to another end portion of the second exit surface in the third direction.

6. The linear light source device according to claim 5, wherein the first exit surface and the second exit surface each constitute a part of a continuous circular arc in a cross section perpendicular to the first direction.

7. An image reading device comprising:
a linear light source device according to claim 5 that applies light to a document;
a lens array that collects reflected light that is light from the linear light source device that has been reflected from the document; and
a light-receiving element that receives the light collected from the lens array;
wherein the linear light source device is disposed such that the second exit surface is in closer proximity with the lens array than the first exit surface is, and the first angle is greater than the second angle.

8. The linear light source device according to claim 1, wherein the one end face of the light-guiding member in the third direction extends further toward one side in the second direction than the other end face does, and
the light exit portion constitutes a flat surface connecting an end edge of the one end face on one side in the second direction to an end edge of the other end face on one side in the second direction.

9. An image reading device comprising:
a linear light source device according to claim 8 that applies light to a document;
a lens array that collects reflected light that is light from the linear light source device that has been reflected from the document; and
a light-receiving element that receives the light collected from the lens array;
wherein the linear light source device is disposed such that an end edge of the other end face on one side in the second direction is in closer proximity with the lens array than an end edge of the one end face on one side in the second direction is.

10. An image reading device comprising:
a linear light source device according to claim 1 that applies light to a document;
a lens array that collects reflected light that is light from the linear light source device that has been reflected from the document; and
a light-receiving element that receives the light collected from the lens array.

11. The linear light source device according to claim 1, wherein each of the plurality of scattering surfaces is elongated in the first direction.

* * * * *